(12) United States Patent
Park et al.

(10) Patent No.: US 7,827,304 B2
(45) Date of Patent: Nov. 2, 2010

(54) METHOD AND SYSTEM FOR VIRTUAL MULTICAST NETWORKING

(75) Inventors: Hyunje Park, Seongnam-si (KR); Yong-Hwa Kim, Incheon-shi (KR)

(73) Assignees: Zooinnet (KR); EGC & C., Ltd (KR); National Computerization Agency (KR)

( * ) Notice: Subject to any disclaimer, the term of this patent is extended or adjusted under 35 U.S.C. 154(b) by 1861 days.

(21) Appl. No.: 10/478,945

(22) PCT Filed: May 28, 2002

(86) PCT No.: PCT/KR02/01003
§ 371 (c)(1), (2), (4) Date: Nov. 26, 2003

(87) PCT Pub. No.: WO02/098063
PCT Pub. Date: Dec. 5, 2002

(65) Prior Publication Data
US 2005/0076207 A1 Apr. 7, 2005

(30) Foreign Application Priority Data
May 28, 2001 (KR) ............................ 2001-0029308

(51) Int. Cl.
*G06F 15/173* (2006.01)
*H04L 12/28* (2006.01)
*H04L 29/06* (2006.01)

(52) U.S. Cl. ........................ 709/238; 370/351; 713/163

(58) Field of Classification Search ................ 709/163; 713/163
See application file for complete search history.

(56) References Cited

U.S. PATENT DOCUMENTS

| 5,305,311 | A | | 4/1994 | Lyles ........................... 370/60 |
| 5,355,371 | A | * | 10/1994 | Auerbach et al. ........... 370/255 |
| 5,361,256 | A | * | 11/1994 | Doeringer et al. ........... 370/390 |
| 5,926,463 | A | * | 7/1999 | Ahearn et al. ............... 370/254 |

(Continued)

FOREIGN PATENT DOCUMENTS

JP 2000-083030 3/2000

(Continued)

OTHER PUBLICATIONS

Sanjoy Paul , Multicasting on the internet and its applications, Kluwer Academic Publishers, 1998, p. 9-138.*

(Continued)

*Primary Examiner*—Saleh Najjar
*Assistant Examiner*—Robert Shaw
(74) *Attorney, Agent, or Firm*—Sheridan Ross P.C.

(57) ABSTRACT

Method and system for virtual multicast networking, which can provide multicasting application service on non-multicast network that does not support multicast, are provided. A virtual multicast networking system for providing virtual multicast network on network environment where a multicast data source network to which multicast data source server is connected is linked through backbone network to non-multicast network that does not support multicast and to which a client is connected, the virtual multicast networking system includes: virtual multicast router system, included in the non-multicast network, for routing or relaying multicast data through tunnelling to multicast router or the nearest virtual multicast router system; multicast agent system, mounted on the client, for receiving the multicast data through tunnelling to the nearest virtual multicast router system, and transmitting the received multicast data to application program mounted on the client; and multicast management system, included in the multicast data source network, for managing the IP address of the virtual multicast router system and transmitting the IP address information of the virtual multicast router system to the virtual multicast router system or the multicast agent system.

18 Claims, 7 Drawing Sheets

U.S. PATENT DOCUMENTS

| | | | | |
|---|---|---|---|---|
| 6,047,330 | A * | 4/2000 | Stracke, Jr. | 709/238 |
| 6,138,144 | A * | 10/2000 | DeSimone et al. | 709/204 |
| 6,167,444 | A * | 12/2000 | Boden et al. | 709/223 |
| 6,181,697 | B1 * | 1/2001 | Nurenberg et al. | 370/390 |
| 6,188,691 | B1 * | 2/2001 | Barkai et al. | 370/390 |
| 6,189,039 | B1 * | 2/2001 | Harvey et al. | 709/232 |
| 6,445,710 | B1 * | 9/2002 | Perlman et al. | 370/401 |
| 6,457,059 | B1 * | 9/2002 | Kobayashi | 709/242 |
| 6,507,562 | B1 * | 1/2003 | Kadansky et al. | 370/216 |
| 6,523,069 | B1 * | 2/2003 | Luczycki et al. | 709/249 |
| 6,526,056 | B1 * | 2/2003 | Rekhter et al. | 370/392 |
| 6,567,929 | B1 * | 5/2003 | Bhagavath et al. | 370/432 |
| 6,584,082 | B1 * | 6/2003 | Willis et al. | 370/316 |
| 6,606,706 | B1 * | 8/2003 | Li | 713/162 |
| 6,615,357 | B1 * | 9/2003 | Boden et al. | 726/15 |
| 6,779,051 | B1 * | 8/2004 | Basil et al. | 710/33 |
| 6,847,638 | B1 * | 1/2005 | Wu et al. | 370/389 |
| 6,862,684 | B1 * | 3/2005 | DiGiorgio | 713/163 |
| 6,880,090 | B1 * | 4/2005 | Shawcross | 726/14 |
| 6,970,926 | B1 * | 11/2005 | Needham et al. | 709/225 |
| 7,117,526 | B1 * | 10/2006 | Short | 726/5 |
| 7,188,191 | B1 * | 3/2007 | Hovell et al. | 709/245 |
| 2002/0001310 | A1 * | 1/2002 | Mai et al. | 370/390 |
| 2002/0010782 | A1 * | 1/2002 | Hoebeke et al. | 709/227 |
| 2002/0026525 | A1 * | 2/2002 | Armitage | 709/238 |
| 2002/0067725 | A1 * | 6/2002 | Oguchi et al. | 370/390 |
| 2002/0067731 | A1 * | 6/2002 | Houston et al. | 370/401 |
| 2002/0120769 | A1 * | 8/2002 | Ammitzboell | 709/238 |
| 2002/0143951 | A1 * | 10/2002 | Khan et al. | 709/227 |
| 2002/0165977 | A1 * | 11/2002 | Novaes | 709/238 |
| 2003/0041170 | A1 * | 2/2003 | Suzuki | 709/238 |
| 2003/0088696 | A1 * | 5/2003 | McCanne | 709/238 |
| 2003/0165140 | A1 * | 9/2003 | Tang et al. | 370/393 |
| 2004/0024901 | A1 * | 2/2004 | Agrawal et al. | 709/238 |
| 2006/0242311 | A1 * | 10/2006 | Mai et al. | 709/229 |

FOREIGN PATENT DOCUMENTS

| | | |
|---|---|---|
| JP | 2000341314 | 12/2000 |
| WO | WO 97/18657 | 5/1997 |

OTHER PUBLICATIONS

Huang, et al, Virtual Multicast Router Over Internet, 15th Distributed Interactive Simulation Workshop (1996).*

Laxman H. Sahasrabuddhe and Biswanath Mukherjee, Multicast Routing Algorithms and Protocols: A Tutorial, IEEE Network, Jan./Feb. 2000, p. 90-102.*

Peter Parnes, Kare Synnes and Dick Schefstrom, mTunnel: A Multicast Tunneling System with a User-Based Quality-of-Service Model, in Lecture Notes in Computer Science: Interactive Distributed Multimedia Systems and Telecommunication Services, Springer Berlin / Heidelberg, vol. 1309/1997.*

Weitzman et al., Distance Vector Multicast Routing Protocol, RFC 1075, Nov. 1988.*

D. Estrin, et al. Protocol Independent Multicast-Sparse Mode (PIM-SM), RFC 2362, Jun. 1998.*

R. Woodburn & D. Mills, A Scheme for an Internet Encapsulation Protocol: Version 1, RFC 1241, Jul. 1991.*

J. Moy, Multicast Extensions to OSPF, RFC 1584, Mar. 1994.*

S. Deering, Host Extensions for IP Multicasting, RC 1112, Aug. 1989 (IGMP).*

W. Fenner, Internet Group Management Protocol, Version 2, RFC 2236, Nov. 1997.*

C. Hedrick, Routing Information Protocol, Rfc 1058, Jun. 1988.*

G. Malkin, RIP Version 2, RFC 2453, Nov. 1998.*

A. Ballardie, Core Based Trees (CBT) Multicast Routing Architecture, RFC 2201, Sep. 1997.*

J. Luciani et al, NBMA Next Hop Resolution Protocol (NHRP), RFC 2332, Apr. 1998.*

D. Farinacci et al, Generic Routing Encapsulation (GRE) RFC 2784, Mar. 2000.*

Huang, et al, Virtual Multicast Router Over Internet, 15th Distributed Interactive Simulation Workshop (1996) http://www.sisostds.org/index.php?tg=fileman&idx=get&id=2&gr=Y&path=Distributed+Interactive+Simulation%2F15th+DIS+Workshop&file=034.doc.*

Peter Parnes, Kare Synnes and Dick Schefstrom, mTunnel: A Multicast Tunneling System with a User-Based Quality-of-Service Model (1998) http://web.archive.org/web/19980714020036/cdt.luth.se/~peppar/progs/mTunnel/IDMS97/mTunnel.pdf.*

Lin et al An Algorithm for Automatic Topology Discovery of IP Networks, IEEE (1998), pp. 1192-1196 http://subversion.assembla.com/svn/pso_minix/documenta%C3%A7%C3%A3o/Referencias/ieice00.pdf.*

Collins & Mahajan, The TAO algorithm for virtual network management (Dec. 13, 1999).*

Narten et al, Neighbor Discovery for IP Version 6 (IPv6) RFC 2461, Dec. 1998.*

Sahasrabuddhe and Mukherjee, Multicast Routing Algorithms and Protocols: A Tutorial, IEEE Network, Jan./Feb. 2000, p. 90-102.*

Notice of Reason for Rejection, dated May 16, 2006, for Japanese Patent Application No. 2003-501134.

* cited by examiner

METHOD AND SYSTEM FOR VIRTUAL MULTICAST NETWORKING

TECHNICAL FIELD

The present invention relates to a multicasting technology in an Internet broadcasting system; and, more particularly, to a virtual multicast networking method for establishing a multicast network without changing existing routers or switches on the Internet, and a system thereof.

BACKGROUND ART

Conventional data transmission method on the Internet is peer-to-peer transmission or unicast transmission, in which data are transmitted from one sending end to one receiving end. However, in case where multicast data transmission is performed in the unicasting method to transmit the same data to many receiving ends, there are problems that the server of the sending has a great deal of load, and the bandwidth of the network is occupied inefficiently.

Furthermore, the problems with performing multicast transmission in the unicasting method become more serious, because the next-generation Internet is based on multimedia data transmission, and the volume of multimedia data is very big.

If the problem with the unicasting method is solved, it is possible to broadcast multimedia data stream, such as video and audio data. In short, although a stream of multimedia data is outputted from a sending end, i.e., media server, once through the Internet, the data stream can be transmitted to all the clients (of a multicast group), which are final receiving ends that desire to receive the data stream, selectively, which is multicast technology. When data is transmitted from the sending end, each client of the multicast group that desires to receive the data can receive the same duplication of the data.

Multicast technology is a mixture of the advantages of unicasting and broadcasting technologies. It enhances the network efficiency and reduces the confusion of a network. Since it duplicates data and transmits the duplicated data to the receiving ends that desire to receive the data, i.e., ones that belong to the multicast group, it prevents unnecessary data reception. Accordingly, an Internet service provider can convert its network into a multicast network using multicast equipment adopting the multicasting technology.

On a multicast network, broadcast data can be transmitted as many as the bandwidth allows on the network, no matter how many clients are connected thereto. For instance, if the allowed bandwidth of a cable TV network is 30 Mbps, 30 one-Mbps broadcast data or 60 500-Kbps broadcast data can be transmitted.

Despite the advantages of multicasting technology, there are many restrictions in converting the existing Internet into a multicast network. For instance, networking equipment that constitutes the Internet does not support the multicasting function, and it costs a lot of money to substitute the equipment with multicast-supporting equipment.

FIG. 1 is a diagram showing a conventional multicast network using a static tunneling technique. So far, to support the multicasting function, all the routers between the media server 101, i.e., sending end, and the clients 103, i.e., the final receiving ends should support the multicasting technology. So, if there are networks 105 and 107 that do not support the multicasting function in between, tunneling method should be used.

According to the conventional tunneling method, when ac router 105 between the sending end and the receiving end does not support the multicast function, a virtual path is formed between multicast-supporting routers 109 to exchange multicast data, and the router 105 that does not support the multicasting function simply relay the multicast data. Between the multicast-supporting routers 109 connected through the tunneling method, the multicast data is encapsulated in the form of a unicast IP packet and transmitted to the encapsulated multicast data by adding a header containing a tunnel source address and a tunnel destination address. So, it has no problem to pass the router 105 that does not support the multicasting function.

The conventional tunneling method is a static technique, so the multicasting function should be set up in the router 109 manually. Accordingly, the router 109 on the part of the media server 101, the sending end, and the router 109 on the part of the client 103 that requires multicasting should be set up with the multicasting function, which acts as a big burden for the Internet service provider, because it should respond to every request for multicast setup from a plurality of clients 103 that desire to receive multicast data.

Furthermore, recent increasing demand for establishing a home network leads to increasing request for multicast service. However, since most clients 103 use flexible IP addresses, it is impossible to establish a multicast network using a static tunneling method. In short, a fixed IP address is needed in order to set up the multicasting function in a router and perform static tunneling, but if a client has a flexible IP address, the multicasting function cannot be set up in the router.

FIG. 2 is a diagram illustrating a conventional multicast network using a peer-to peer (P2P) transmission technique. Since it becomes hard to modify the scheme of a router, a multicast method is developed recently that makes other clients receive data by making a client, which has received the data from the sending end in the unicasting method, upload the received data on the Internet and relay the data to other clients.

According to the multicasting method, a client 213 receives data from the data transmission server 207 of a network 201 having a data source 205 in the unicasting method, and the client 213 uploads the received data on the network 203, to which it belongs, and then other clients 215 and 217 on the network receive the data from the client 213.

In short, when a client of a network receives data, the client performs as a repeater and thereby other client on the same network can receive the data.

As networks are mainly formed of routers and many routers and switches support the multicasting function recently, using the routers to the maximum extent makes it easy to administrate the network and reduces errors. However, this multicasting method also have a problem that the performance is deteriorated due to the limit in the upload speed on an asymmetric network, such as xDSL or cable network.

DISCLOSURE OF INVENTION

It is, therefore, an object of the present invention to provide a method and system for virtual multicast networking that can make clients receive multicast data even on a network that does not support multicasting function, without substituting or modifying networking equipment.

Those skilled in the art of this invention may understand the other objects and advantages of the present invention easily from the drawings, detailed description, and claims of this specification.

In accordance with one aspect of the present invention, there is provided a virtual multicast networking system including a client and a multicast source network having a multicast source server, for providing a virtual multicast network in a network environment wherein a non-multicast network that does not support a multicast function is connected through a backbone network, the virtual multicast networking system comprising: a virtual multicast router system included in the non-multicast network, for transmitting or relaying encapsulated multicast data through tunneling with a multicast router or the nearest virtual multicast router system; a multicast agent system loaded on the client, for receiving the encapsulated multicast data through dynamic tunneling with the nearest virtual multicast router system, extracting the multicast data transmitted by the multicast source server from the encapsulated multicast data, and transmitting the extracted multicast data to an application program loaded on the client; and a multicast administration system included in the multicast source network, for managing the IP addresses of the virtual multicast router system, and transmitting the address information of the virtual multicast router system to the virtual multicast router system or the multicast agent system.

In accordance with another aspect of the present invention, there is provided a method for performing virtual multicast networking in a virtual multicast networking system, the method comprising the steps of: a) at a virtual multicast router system included in the non-multicast network, transmitting or relaying encapsulated multicast data through tunneling with a multicast router or the nearest virtual multicast router system; b) at a multicast agent system loaded on the client, receiving the encapsulated multicast data through dynamic tunneling with the nearest virtual multicast router system, extracting the multicast data transmitted from the multicast source server from the received encapsulated multicast data, and transmitting the extracted multicast data to an application program loaded on the client; and c) at a multicast administration system included in the multicast source network, managing the IP addresses of the virtual multicast router system, and transmitting the address information of the virtual multicast router system to the virtual multicast router system or the multicast agent system.

In accordance with further anther aspect of the present invention, there is provided a virtual multicast networking system including a client and a multicast source network having a multicast source server, for providing a virtual multicast network in a network environment wherein a non-multicast network that does not support a multicast function is connected through a backbone network, the virtual multicast networking system comprising: a virtual multicast router system included in the non-multicast network, for transmitting or relaying encapsulated multicast data through tunneling with a multicast router or the nearest virtual multicast router system; and a multicast agent system loaded on the client, for receiving the encapsulated multicast data through dynamic tunneling with the nearest virtual multicast router system, extracting the multicast data transmitted from the multicast source server from the encapsulated multicast data, and transmitting the extracted multicast data to an application program loaded on the client.

According to this invention, it is possible to provide multicast service on a network that does not support multicasting function. A networking system in accordance with the embodiment of the present invention includes a multicast administration server, a virtual multicast router and a multicast agent.

The multicast administration server administrates IP addresses of the respective multicast routers, and the addresses are used for the multicast administration server to search for an arbitrary virtual multicast router or a virtual multicast router closest to the multicast agent. The IP address of a virtual multicast router searched out later is cached in the multicast administration server for quick search.

The virtual multicast router performs multicast routing, and transmits multicast data to users on a network that does not support multicasting.

The virtual multicast router can be connected to another virtual multicast router through dynamic tunneling. Accordingly, a virtual multicast network can be established on a network that does not support multicasting, without any separate setup in the network scheme.

According to the embodiment of the present invention, a multicast agent is set up in the client to transmit and receive multicast data through the virtual multicast router.

BRIEF DESCRIPTION OF DRAWINGS

The above and other objects and features of the present invention will become apparent from the following description of the preferred embodiments given in conjunction with the accompanying drawings, in which.

BEST MODE FOR CARRYING OUT THE INVENTION

Figure 1:
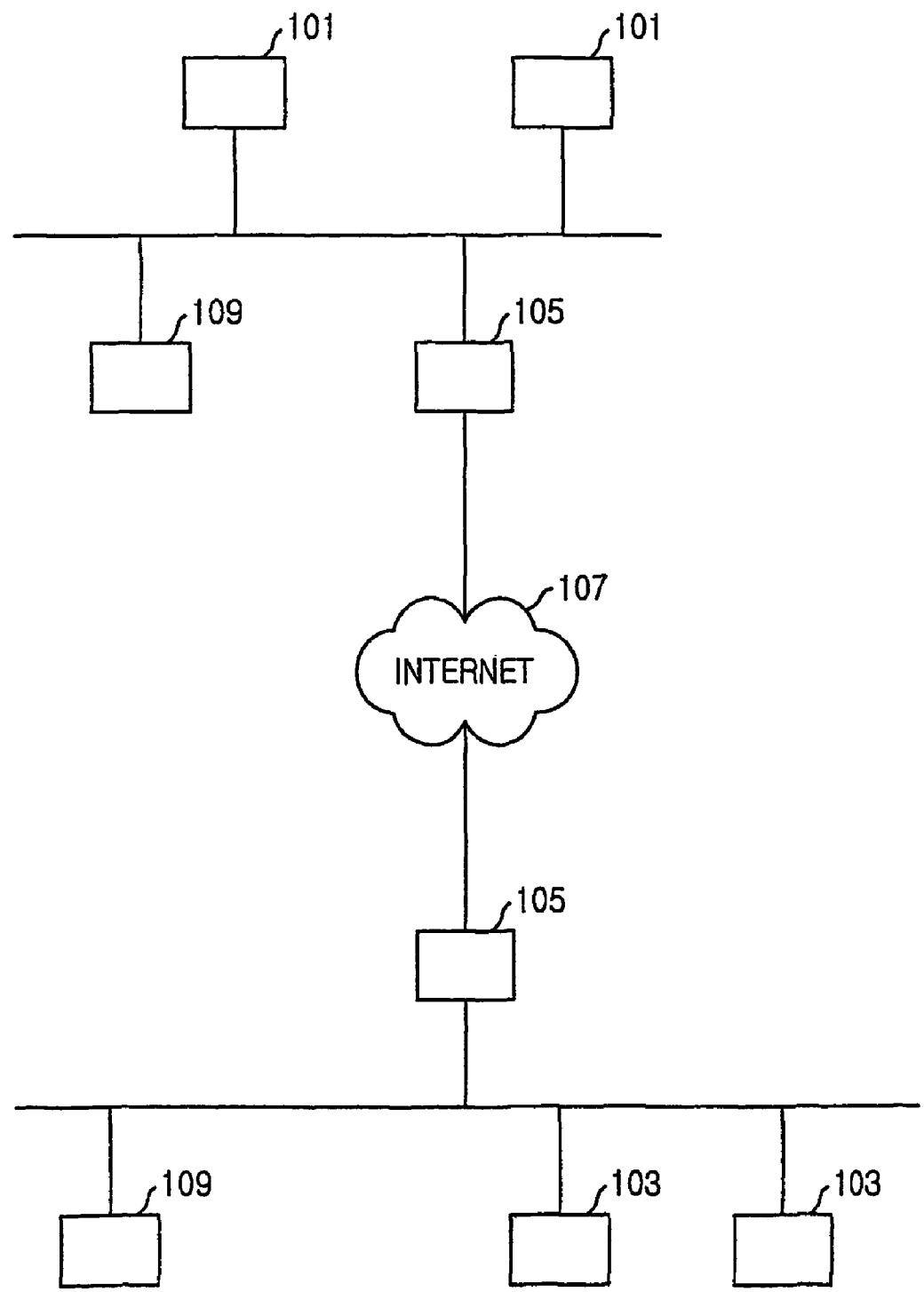
FIG. 1 is a diagram illustrating a multicast network to which a conventional static tunneling is applied.
Figure 2:
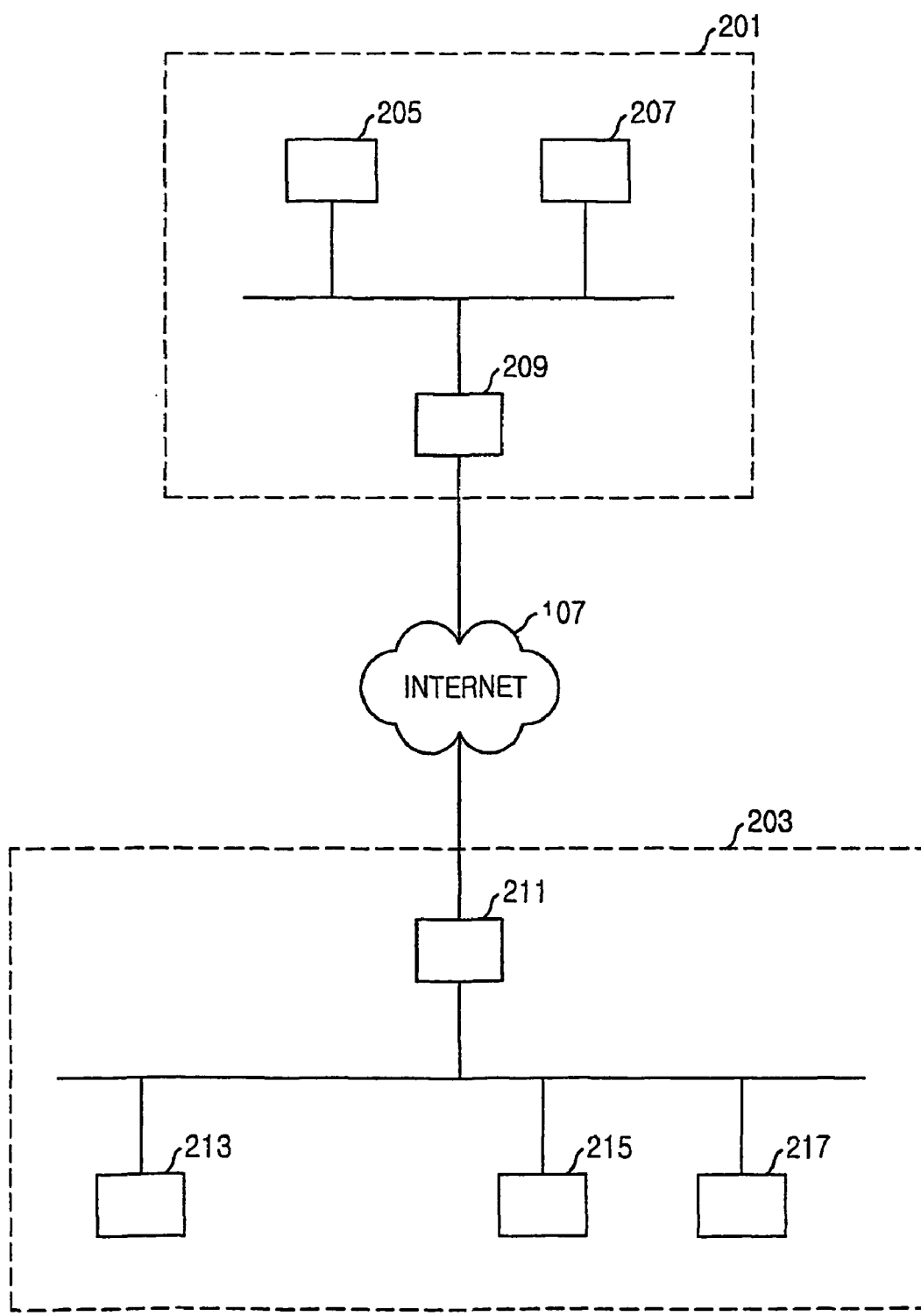
FIG. 2 is a diagram showing a multicast network to which a conventional peer-to-peer transmission technique is applied.

Other objects and aspects of the invention will become apparent from the following description of the embodiments with reference to the accompanying drawings, which is set forth hereinafter. The same reference numerals in different drawings represent the same elements, and thus their descriptions will be omitted. While describing this invention, if more concrete description of the related arts is considered to blur the point of this invention, the description will be omitted.

An asymmetric digital subscriber line (ADSL) network illustrated in the drawings to describe an embodiment of the present invention is a network that does not support multicasting. It is obvious to those skilled in the art of this invention that the ADSL network as shown in the drawings can be variously changed into another form of a network that does not support multicasting, either, such as integrated services digital network (ISDN), cable network, and radio network. Therefore, this invention should be construed not limited to the ADSL network illustrated in the drawings.

Figure 3:
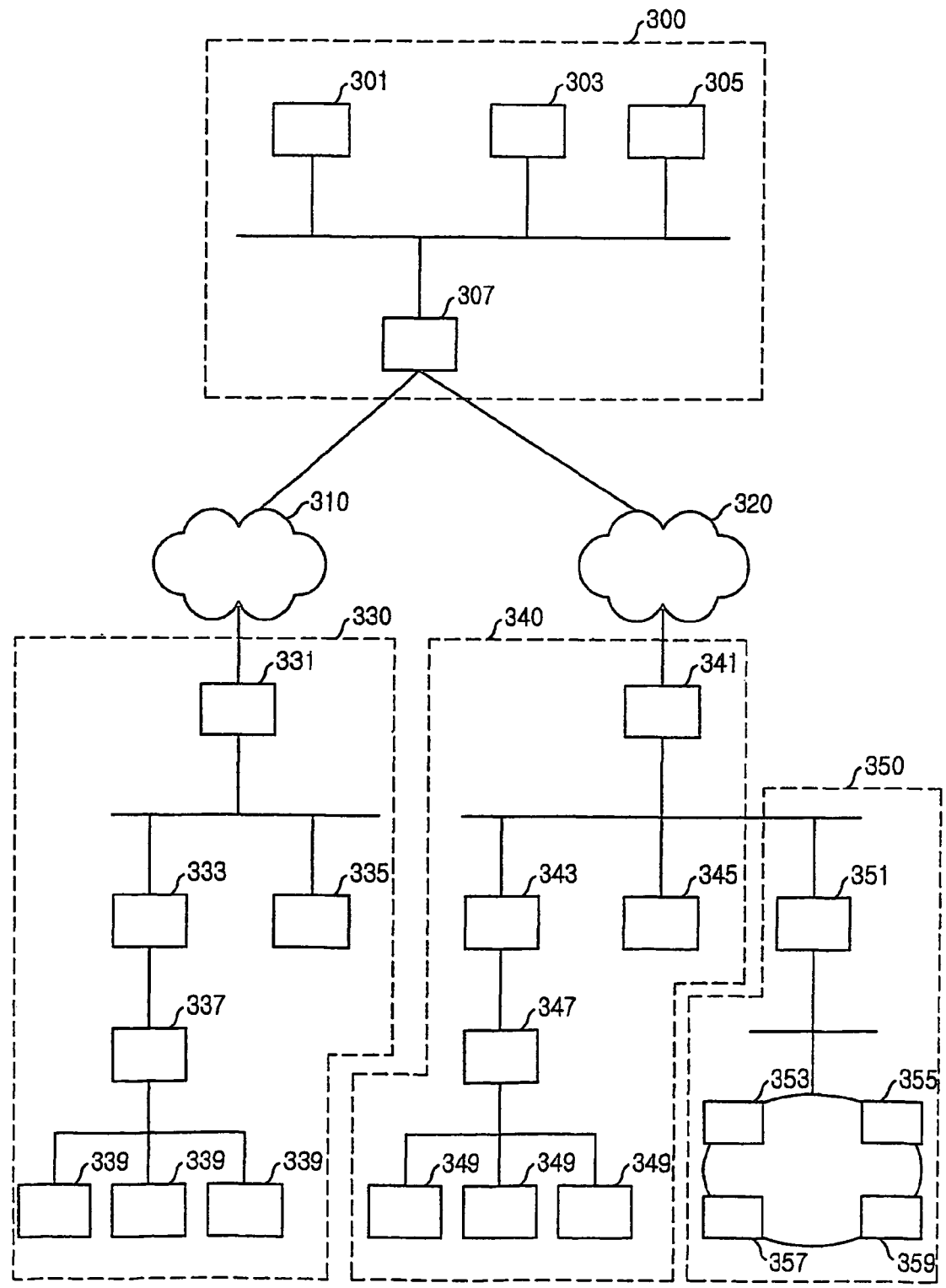
FIG. 3 is a diagram describing a virtual multicast network in accordance with a first embodiment of the present invention.

FIG. 3 is a diagram describing a virtual multicast network in accordance with a first embodiment of the present invention. As illustrated in the drawing, the application environment of the virtual multicast networking method and system of the present invention includes a multicast source network 300 connected to a backbone network 310 in support of the multicasting function or a backbone network 320 that does not support the multicasting function.

The multicast source network 300 includes a multicast source, which is a media server 301, a multicast administration server 303, a virtual multicast router 305, and a multicast router 307. In case where a backbone network supports the multicasting function, the multicast router 307 operates to connect the multicast source network 300 to the backbone network 310 in support of the multicasting function. On the other hand, the virtual multicast router 305 operates to connect the multicast source network 300 to the backbone network 320 that does not support the multicasting function, in case where a backbone network supports the multicasting function. Accordingly, it is obvious to those skilled in the art that the virtual multicast router 305 and/or the multicast router 307 may be set up together or separately, according to the environment of a backbone network connected with the multicast source network 300.

The multicast administration server 303 administrates the IP addresses of virtual multicast routers. Later, the multicast administration server 303 searches the IP addresses of all virtual multicast routers to find out the nearest virtual multicast router.

In case of the backbone network 310 supporting the multicast function, the virtual multicast router can be set up on an xDSL network, or in a home gateway of a home network.

In case of the backbone network 320 not supporting the multicast function, the virtual multicast router can be set up on the multicast source network 300 and the xDSL network to form a multicast network through dynamic tunneling.

In short, the virtual multicast networking in accordance with the present invention can be formed in two different environments, and in an environment combining the two environments.

First, there is a case where the multicast-supporting backbone network 310 is connected to a non-multicast network—for example, an ADSL network 330—through a non-multicast router 331. Most ADSL networks do not support the multicasting function.

The ADSL network 330 includes a virtual multicast router 335 of the present invention, and a plurality of clients 339 are connected to an ADSL network 330 through an ADSL server (b-RAS) 333 and ADSL service device (DSLAM) 337. That is, in accordance with the embodiment of the present invention, the virtual multicast router 335 is set up on a sub network, such as b-RAS 333 that forms the ADSL network 330, to support multicasting.

The multicast router included in the multicast source network 300 and the virtual multicast router in the ADSL network 330 transmits and receives multicast data through static tunneling. For static tunneling, an IP tunneling technique may be used, and as multicast routing protocol, protocol independent multicast-sparse mode (PIM-SM), distance vector multicast routing protocol (DVMRP), or source specific multicast (SSM) can be used. To perform the static tunneling, tunneling setup data is set up in advance in the configuration file of the routers 307 and 335.

To receive multicast data transmitted from the multicast source network 300, the clients 339 searches for the nearest virtual multicast router 335 from the multicast administration server 303, and then registers the address of the nearest virtual multicast router 335 in the multicast group (Dynamic tunneling).

When the virtual multicast router 335 receives data heading for the addresses of the multicast group, it encapsulates the data and transmits the encapsulated data to the multicast agent of the registered clients 339 through the path set up by the tunneling method. The multicast agent removes the header containing the tunnel source address and the tunnel destination address from the encapsulated multicast data, and then transmits the multicast data to an application program set up in the clients 339.

The tunneling between the virtual multicast router 335 and the multicast agents of the clients registered in the multicast group, and the method of data transmission through a path set up by the tunneling are various based on the environment of networks, to which the virtual multicast router receiving the multicast data or the multicast agent belongs to. For example, a tunneling set up from the virtual multicast router 335 to a virtual multicast router of a non-multicast network or a multicast agent may be IP tunneling, UDP tunneling, or TCP tunneling. The method of data transmission through a path set up by this tunneling method may be IP multicast transmission or UDP/TCP unicast transmission. In case where the virtual multicast router or multicast agent is in a network address translator (NAT) or firewall environment, multicast data are transmitted by the TCP tunneling, and in other cases, they are transmitted by the UDP tunneling.

Second, there is a case where the non-multicast backbone network 320 is connected to a non-multicast network—for example, an ADSL network 340—through a non-multicast router 341. The ADSL network 340 includes a virtual multicast router 34 of the present invention, and a plurality of clients 349 are connected to the ADSL network 340 through the ADSL server (b-RAS) 343 and ADSL service device (DSLAM) 347. That is, in accordance with the first embodiment of the present invention, the virtual multicast router 345 is set up on a sub network, such as b-RAS 343 that forms the ADSL network 340, to support the multicast.

A home network 350 includes a home network gateway 351 connected to the non-multicast router 341, a TV set 353, which is a home network client, a desktop computer 355, a video camera 357, and a laptop computer 359.

The virtual multicast router of the present invention can be used as an exclusive hardware system that performs the role of a multicast router in a non-multicast network, such as xDSL, or a server software in the home network gateway 351 needed to establish a home network.

The virtual multicast router 345 or 351 sets up a data path with the virtual multicast router 305 included in the multicast source network 300 by performing dynamic tunneling to form a virtual multicast network. Also, the dynamic tunneling is carried out between the virtual multicast routers 345 and 351, too, to provide multicast service to the home network environment 350.

When the virtual multicast router 345 or 351 receives multicast data from the multicast source network 300, it transmits the multicast data to the clients 349, 355, and 359 registered in the multicast group.

Third, there is a case where the non-multicast backbone network 320 is connected to a multicast-supporting network through the virtual multicast router of the present invention (not shown). In this case, the virtual multicast router sets up a data path with the virtual multicast router 305 in the multicast source network 300 by performing dynamic tunneling. The router and clients on a multicast-supporting network can receive data transmitted in a multicast method from the virtual multicast router that are connected with a backbone network and has a path that leads to the virtual multicast router 305, the path being set up in the dynamic tunneling method.

For instance, the router and clients of a multicast-supporting network receives data transmitted in the IP multicasting method from the virtual multicast router that are connected with a backbone network and has a path that leads to the virtual multicast router 305, the path being set up in the dynamic tunneling method.

In short, the virtual multicast router of the present invention can set up a data transmission path by performing tunneling in various methods according to the environment of its sub-network, and on the other hand, it can also transmit encapsulated data to the virtual multicast router or multicast agent in various data transmission methods.

Figure 4:
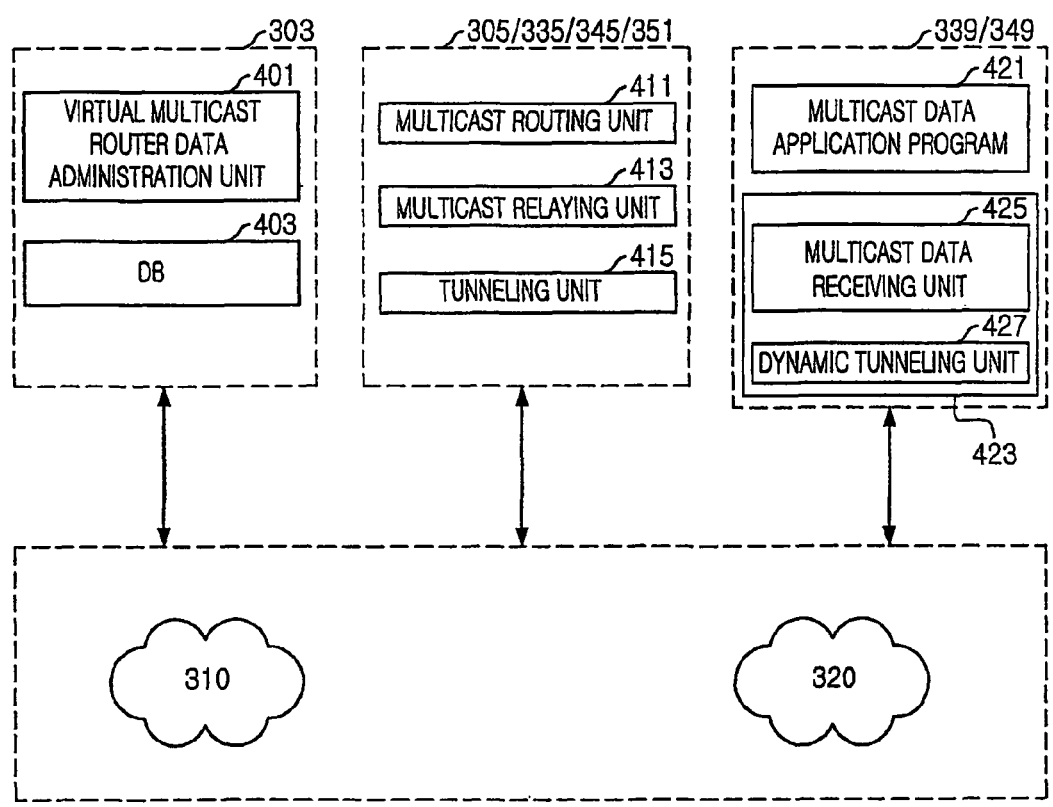
FIG. 4 is a block diagram showing the system of the virtual multicast network of FIG. 3 in accordance with the first embodiment of the present invention.

FIG. 4 is a block diagram showing the system of the virtual multicast network of FIG. 3. In accordance with the first embodiment of the present invention, the multicast networking system includes the multicast administration server 303, virtual multicast router 305, 335, 345, and 351, and multicast agent 423.

The multicast administration server 303 includes a virtual multicast router data administration unit 401 and a database 403. The virtual multicast router data administration unit 401 administrates the IP address of the virtual multicast router, and upon receipt of a request for searching IP addresses of the virtual multicast routers 305, 335, 345, and 351 transmitted from a multicast agent 423 or the virtual multicast routers 305, 335, 345, and 351, it refers to the IP addresses of the virtual multicast routers stored in the database 403, and searches for the nearest virtual multicast router 305, 335, 345, or 351 from the virtual multicast routers 305, 335, 345, and 351. The search result is transmitted to a corresponding multicast agent 423 or the virtual multicast routers 305, 335, 345, and 351.

In general, since the multicast agent 423 of the clients and the virtual multicast routers 305, 335, 345, and 351 search for the nearest virtual multicast router 305, 335, 345, or 351 by calculating hop counters, the nearest virtual multicast router 305, 335, 345, or 351 is always the same. In this case, it takes very long time to set up a path and, the bandwidth of the network is wasted due to unnecessary data transmission, because IP addresses of all the virtual multicast routers should be transmitted from the multicast administration server 303 and then the nearest virtual multicast router should be searched for to set up a path every time.

To perform searching and set up a path quickly, the multicast administration server 303 forms a caching table of the IP addresses and network addresses of the multicast agent 423 which has requested searching or virtual multicast routers 305, 335, 345, and 351, and the IP address of a virtual multicast router that is searched out to be the nearest one from the multicast agent 423 or virtual multicast routers 305, 335, 345, and 351, and store the caching table in the database 403. The caching table reduces time for setting up a path of the multicast agent 423 or virtual multicast routers 305, 335, 345, and 351 through dynamic tunneling by performing quick searching, and prevents unnecessary data transmission.

The virtual multicast routers 305, 335, 345, and 351 includes a tunneling unit 415 for performing static and/or dynamic tunneling between general multicast routers or virtual multicast routers, a multicast routing unit 411, and a multicast relaying unit 413.

The virtual multicast routers 305, 335, 345 can be formed as an exclusive hardware virtual multicast router that can embody multicast networking with respect to a non-multicast network 330, 340, or 350, or in the home networking environment, it can be embodied as a software that enables multicast networking and installed in a home network gateway and a router of a non-multicast network.

The virtual multicast router of the present invention sets up a data transmission path by performing tunneling in various methods, such as IP tunneling, UDP tunneling, and TCP tunneling according to the environment of its sub-network, and it also transmits encapsulated data to the virtual multicast router of the sub-network or multicast agent in diverse data transmission methods, such as IP multicast transmission, and UDP/TCP unicast transmission.

For example, tunneling from the virtual multicast router 335 to the virtual multicast router of a non-multicast network or the multicast agent can be IP tunneling, UDP tunneling, or TCP tunneling, and the data transmission method-through a path set up by this tunneling can be the IP multicast transmission, or UDP/TCP unicast transmission.

Meanwhile, in case where a multicast-supporting network is connected to the non-multicast backbone network 320 through the virtual multicast router of the present invention, the virtual multicast router sets up a data path with the virtual multicast router 305 on the multicast source network 300 by performing the dynamic tunneling to form a virtual multicast network, and the router and clients on the multicast-supporting network can receive data in the IP multicast data transmission method from the virtual multicast router, which is connected with the backbone network, and has a path set up with the virtual multicast router 305 by performing dynamic tunneling.

Static tunneling performed by the tunneling unit 415 is a method used between the multicast router 307 and the virtual multicast routers 305, 335, 345, or 351. As described above, the multicast router 307 on the multicast source network 300 and the virtual multicast router 335 on the ADSL network 330 transmits and receives multicast data through the static tunneling. As a static tunneling, the IP tunneling method can be used. For performing the static tunneling, tunneling setup data are stored in the configuration file of the routers 307 and 335 in advance.

Also, dynamic tunneling performed by the tunneling unit 415 is a method used between a virtual multicast router and a virtual multicast router—or example, between the virtual multicast routers 305 and 345, or between the virtual multicast routers 345 and 351. In the dynamic tunneling, the IP tunneling method can be used, too, just as the static tunneling, and UDP tunneling and TCP tunneling methods can be used as well. Different from static tunneling, the dynamic tunneling is performed dynamically on the request of the virtual multicast router, and the removal of the tunneling is carried out dynamically, too.

Meanwhile, the virtual multicast routers 305, 335, 345, or 351 perform different functions depending on the presence of a multicast router on the sub-network it belongs to. That is, the virtual multicast routers 305, 335, 345, and 351 examine if there is a multicast router on the sub-network it belongs to, and if there is a multicast router, it does not perform the role of a multicast router, but simply performs the role of a multicast repeater. If there is no multicast router after searching, it performs the roles of a multicast router and multicast repeater simultaneously. Therefore, in accordance with the first embodiment of the present embodiment, the virtual multicast routers 305, 335, 345, and 351 are activated to operate as the multicast routing unit 411 and/or multicast repeater 413, which will be described later, selectively depending on the environment of the sub-network it belongs to.

The multicast routing unit 411 that performs as a multicast router routes multicast data, using standard multicast routing protocol, which is Protocol Independent Multicast-Sparse Mode (PIM-SM), Distance Vector Multicast Routing Protocol (DVMRP), or Source Specific Multicast (SSM).

The multicast repeater 413 receives multicast data and transmits them to the clients 339, 349, 353, and 359 with a network in the non-multicast network environments 330, 340, and 350. The multicast repeater 413 administrates the joining and secession to and from a particular multicast group.

Membership information is registered, when the clients 339, 349, 353 and 359 transmit the multicast address and port number of a multicast group they want to join, after the virtual multicast router or multicast agent sets up a path with another virtual multicast router through dynamic tunneling. The membership information includes the addresses of the clients in the multicast group, port number of the multicast group, and address of a multicast agent or virtual multicast router registered in the multicast group.

When the clients 339, 349, 353, and 359 are registered in a particular multicast group, and then the virtual multicast routers 305, 335, 345, and 351 receive multicast data to be transmitted to the clients 339, 349, 353, and 359 of the multicast group, the received data are encapsulated and transmitted to the multicast agent mounted on the clients 339, 349, 353, and 359 of the multicast group, or another virtual multicast router.

In case where the network including the virtual multicast routers 305, 335, 345, and 351 supports broadcasting or unicasting only, the Internet group management protocol (IGMP) snooping of the L2 switch can be emulated.

IGMP Snooping is a well-known technology that makes a switch transmit multicast traffics intelligently. Based on the IGMP query and report message, a switch transmits traffics only to the ports that have requested multicast. This method prevents the switch from broadcast traffics and affecting the performance of the network. IGMP needs a router that can figure out if a multicast group exists on the sub-network, and administrates the membership of the group.

The multicast agent 423 is a system mounted on the client to receive multicast data. It includes a dynamic tunneling unit 427 for performing dynamic tunneling to set up a path with the multicast data receiving unit 425 and thus receive multicast data on a non-multicast network 330, 340, or 350.

The dynamic tunneling unit 427 requires the IP address of a virtual multicast router nearest to the multicast administration server 303. If the IP address of the nearest virtual multicast router is informed by the multicast administration server 303, the dynamic tunneling unit 427 sets up a path by performing dynamic tunneling. Otherwise, it brings the IP addresses of all virtual multicast routers, and then searches for the nearest virtual multicast router based on the IP addresses. The dynamic tunneling unit 427 calculates the hop counters of the IP addresses, and searches for the nearest virtual multicast router. That is, a virtual multicast router with an IP address having the smallest hop counter is considered to be in the nearest location.

After finding the nearest virtual multicast router, the multicast agent 423 requests it to join the multicast group. If the request is accepted, the multicast agent 423 can receive multicast data from the moment. When the multicast agent 423 receives multicast data through the multicast data receiving unit 425, it resets Time to Live (TTL) at 0, using the IP multicast inside the client, and performs multicast again, and then the multicast application program receives multicast data.

Figure 5:
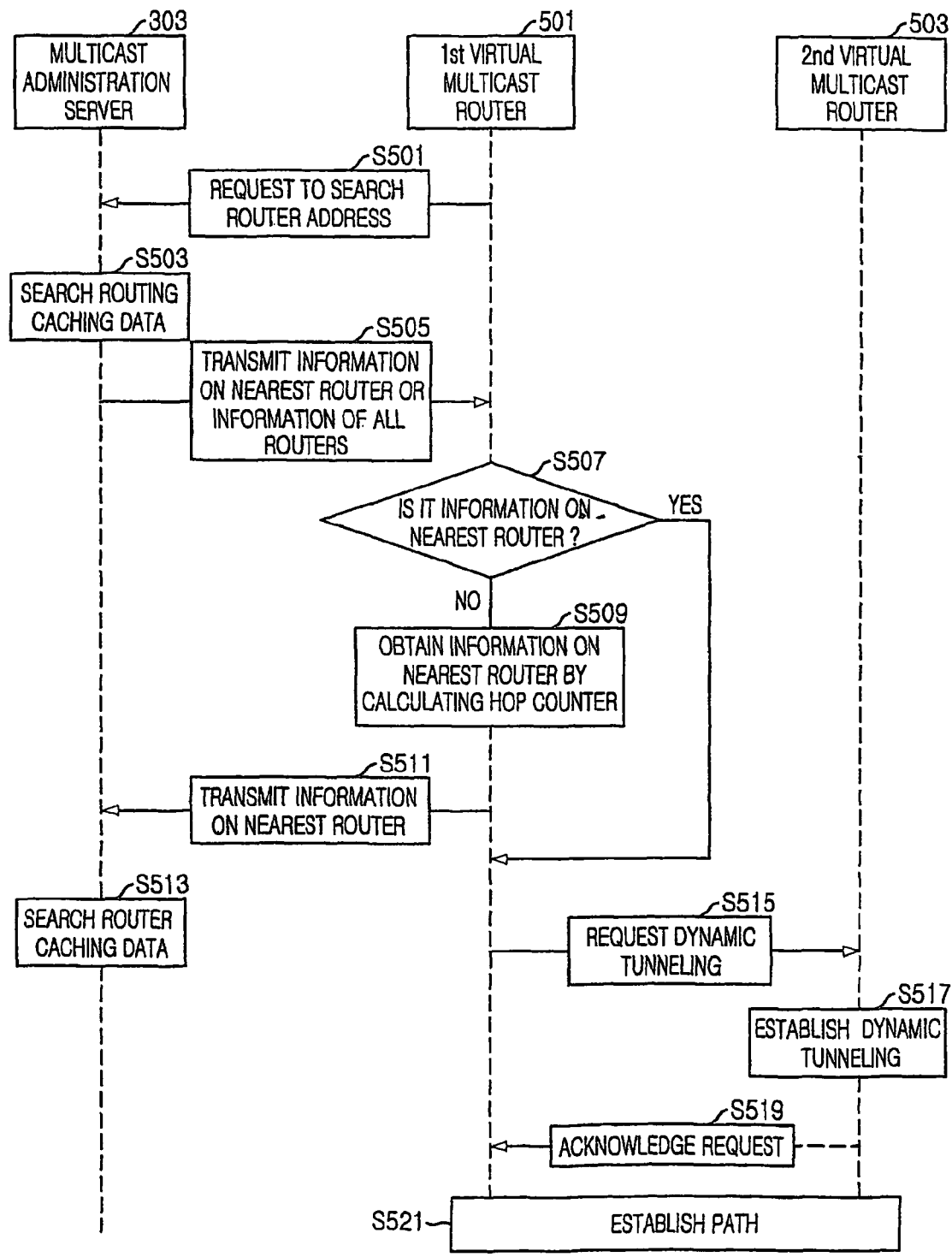
FIG. 5 is a transaction flow chart describing the dynamic tunneling between the multicast routers in accordance with the first embodiment of the present invention.

FIG. 5 is a transaction flow chart describing the dynamic tunneling between the multicast routers in accordance with the first embodiment of the present invention. The process of dynamic tunneling of each virtual multicast router 305, 335, 345, or 351 is as follows.

At step S501, a first virtual multicast router 501 requests data of the nearest virtual multicast router, i.e., its IP address, to the multicast administration server 303, the IP address of the first virtual multicast routes 501 already registered in the multicast administration server 303. At step S503, the multicast administration server 303 searches the virtual multicast router caching data stored in the database 403, and then at step S505, if there are data on the nearest multicast router, it transmits the data, otherwise, transmits data on all virtual multicast routers.

At step S507, the first virtual multicast router 501 that has received the router data from the multicast administration server 303 determines whether the received data is on the nearest virtual multicast router, that is, whether the data is about one single virtual multicast router, and at step S515, if the router data proves to be the nearest virtual multicast router, it requests dynamic tunneling to the nearest virtual multicast router, i.e., a second virtual multicast router 503. In case where the received data at the step S507 are not data on one virtual multicast router, but on all virtual multicast routers, at step S509, it acquires data on the nearest virtual multicast router from the received data on all virtual multicast routers by calculating hop counter, as described above.

The data on the nearest virtual multicast router is obtained from the above received data on all virtual multicast routers by calculating hop counter, because the first virtual multicast router 501 has never transmitted the data on the nearest virtual multicast router to the multicast administration server 303 before. Therefore, once the first multicast router 501 calculates hop counters and obtains data on the nearest virtual multicast router 503, at step S511, it transmits the data on the nearest virtual multicast router to the multicast administration server 303, and at step S513, the multicast administration server 303 updates the caching table of virtual multicast router IP addresses stored in the database 403. Later on, if the data on the nearest virtual multicast router is requested again from the first virtual multicast router 501, the multicast administration server 303 transmits the data on the nearest virtual multicast router based on the updated caching table.

Meanwhile, at step S515, the first virtual multicast router 501 that has obtained data on the nearest virtual multicast router 503 at the step S509 requests dynamic tunneling to the second virtual multicast router 503. The request for dynamic tunneling includes the IP address of the first virtual multicast router 501 as a destination address of the multicast data, which is used to encapsulate the multicast data.

At step S517, the second virtual multicast router 503 performs setting for dynamic tunneling, taking its IP address as a transmission source (tunnel source) address of encapsulated multicast data, and the IP address of the first virtual multicast router 501 as the destination (tunnel destination) address of the encapsulated multicast data. Then, at step S519, if the acknowledgement for the dynamic tunneling request is transmitted to the first virtual multicast router 501, at step S521, a path is set up between the first virtual multicast router 501 and the second virtual multicast router 503 by performing dynamic tunneling. That is, going through the flow illustrated in FIG. 5, the virtual multicast router performs dynamic tunneling with the nearest virtual multicast router among other virtual multicast routers, and a multicast tree is formed by the multicast tree forming algorithm of the PIM-SM, DVMRP, or SSM.

Figure 6:
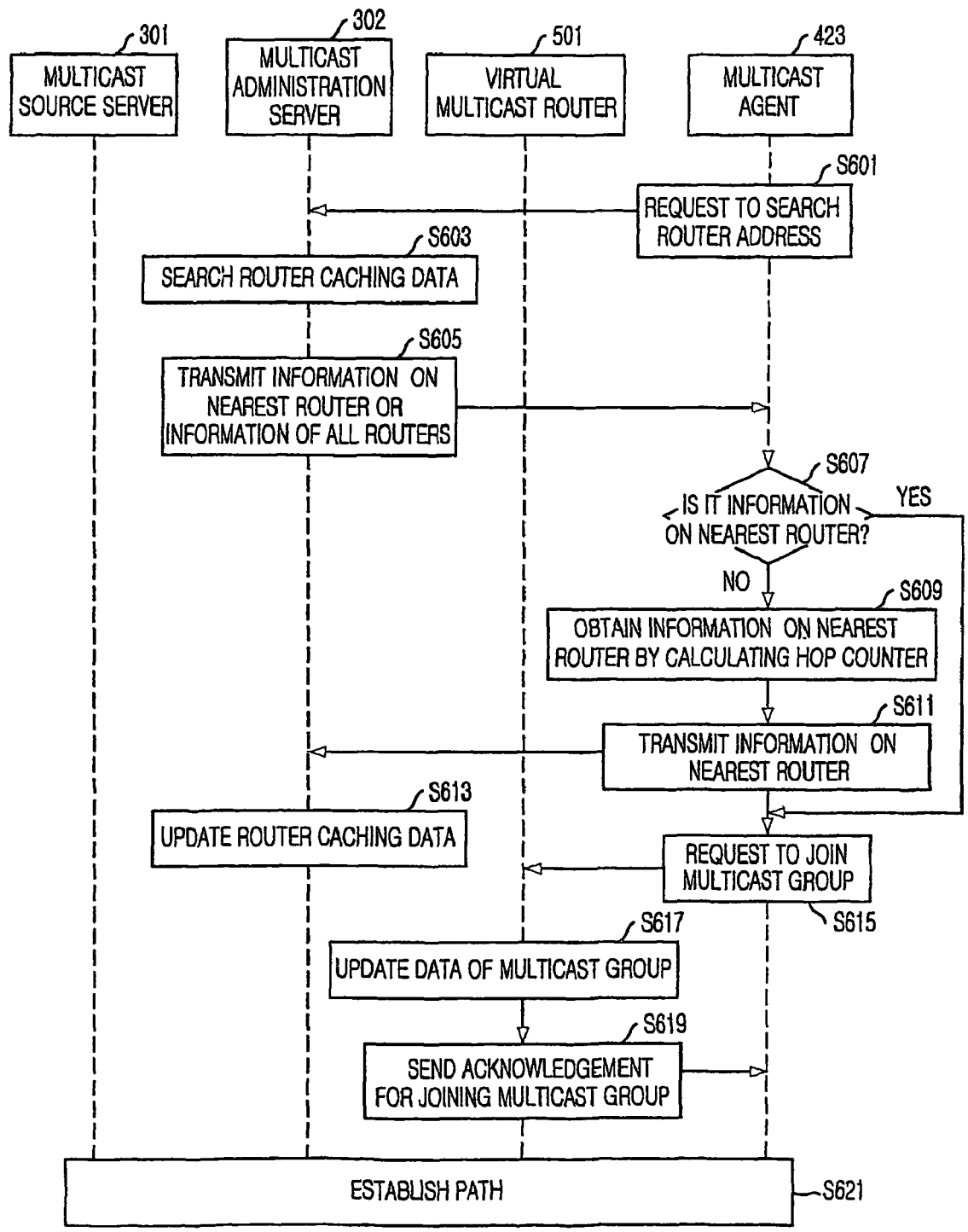
FIG. 6 is a transaction flow chart describing a multicast agent receiving the multicast data in accordance with the first embodiment of the present invention.

FIG. 6 is a transaction flow chart describing the multicast data reception of a multicast agent in accordance with the first embodiment of the present invention. It is assumed that a path is already set up between the virtual multicast router 501 of the network 330, 340, or 350, to which the multicast agent 423 belongs and the multicast source server 301, and this assumption can be expected, from the logic flow illustrated in FIG. 5 sufficiently.

At step S601, when the IP address of the multicast agent 423 is registered in the multicast administration server 303, the multicast agent 423 requests the multicast administration server 303 for data on the nearest virtual multicast router, that is, IP address. At step S603, the multicast administration server 303 searches virtual multicast router caching data stored in the database 403, and if there is registered data on the nearest multicast router, transmits the data, and otherwise, if there is no registered data on it, at step S605, the multicast administration server 303 transmits data on all virtual multicast routers.

At step S607, the multicast agent 423 which has received data on a router from the multicast administration server 303 determines whether the received data are data on the nearest virtual multicast router, that is, the data is about one virtual multicast router, if the data is about the nearest virtual multicast router, at step S615, it requests the nearest virtual multicast router, for example a virtual multicast router 501, to join the multicast group.

Otherwise, if the data received at the step S607 are about all virtual multicast routers, at step S609, it obtains data on the nearest virtual multicast router from the received data on all virtual multicast router addresses. By calculating hop counters of all the virtual multicast routers, the data on the nearest virtual multicast router can be obtained.

Since the multicast agent 423 has not transmitted any data on the nearest virtual multicast router to the multicast administration server 303 before, it is possible for the multicast agent 423 to obtain data on the nearest virtual multicast router by calculating the hop counters. Accordingly, at step S611, once the multicast agent obtains the data on the nearest virtual multicast router 501, it transmits the data to the multicast administration server 303. Then, at step S613, the multicast administration server 303 updates the virtual multicast router IP address caching table, which is stored in the database 403. Later on, when the IP address of the nearest virtual multicast router is requested again by the multicast agent 423, the multicast administration server 303 transmits the data on the nearest virtual multicast router 501 based on the updated caching table.

Meanwhile, at step S615, the multicast agent 423 that obtained the data on the nearest virtual multicast router 501 requests the multicast agent 423 to join the multicast group through the nearest virtual multicast router 501. The request for joining a multicast group is a request asking for dynamic tunneling, and it includes the IP address of the multicast agent 423 as the address of the destination of multicast data, which is used to encapsulate the multicast data.

At step S617, in response to the request for joining the multicast group, the virtual multicast router 501 updates the group data with its IP address as a transmission source (dynamic tunnel source) address of the encapsulated multicast data and the IP address of the multicast agent 423 as the destination address of the encapsulated multicast data, and, at step S619, it transmits acknowledgement of the multicast group request. Then, at step S621, a path between the multicast agent 423 and the multicast router is set up.

In short, when the multicast agent is registered in the multicast group, and when data are transmitted from the multicast source server 301, the virtual multicast router 501 checks out the address of the multicast data and transmits the multicast data to the multicast agent 423 registered on the multicast group. The multicast agent 423 that has received the multicast data from the virtual multicast router 501 removes the header, which contains the tunnel source address and the tunnel destination address, from the IP encapsulated multicast data, and perform re-multicasting to a multicast data application program loaded on a client.

Figure 7:
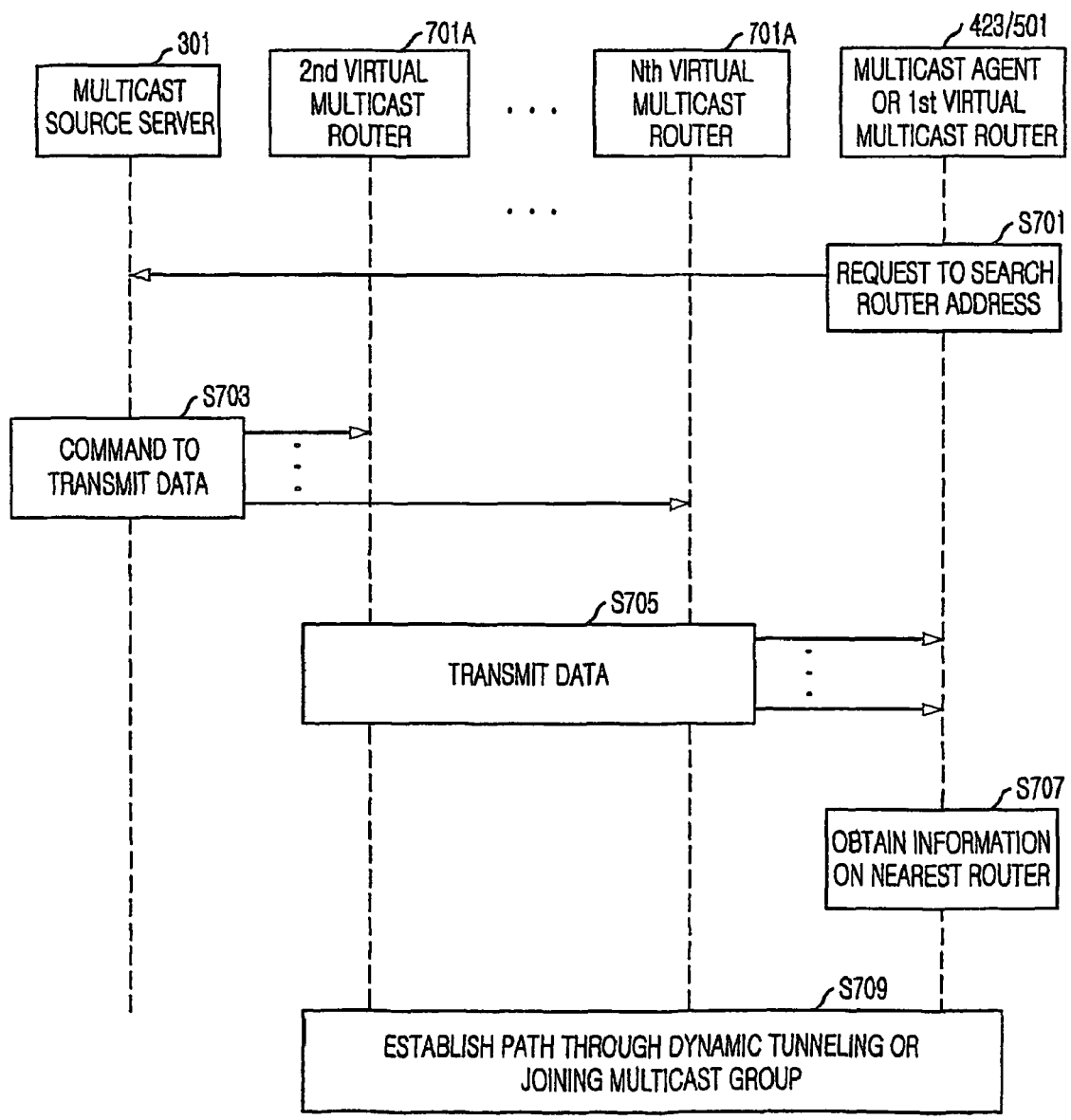
FIG. 7 is a diagram showing the process of a multicast agent or a virtual multicast router searching for the nearest virtual multicast router in accordance with a second embodiment of the present invention.

FIG. 7 is a diagram showing the process of a multicast agent or a virtual multicast router searching for the nearest virtual multicast router in accordance with a second embodiment of the present invention.

In FIGS. 5 and 6, the multicast agent 423 or the first virtual multicast router 501 determines if the router data transmitted from the multicast administration server 303 is on the nearest virtual multicast router at step S507 or S607. If the received data prove to be data on all virtual multicast routers, at step S509 or S609, their hop counters are calculated from the received data on all virtual multicast router addresses and the data on the nearest virtual multicast router are obtained.

FIG. 7 shows another embodiment for obtaining data on the nearest virtual multicast router data not by calculating hop counters as described in FIGS. 5 and 6, but by calculating round trip time (RTT).

First, the multicast source server 301 calculates the RTT values between the multicast source server 301 and the virtual multicast routers 501 and 701*a* to 701*n* by transmitting a message to each of the virtual multicast routers 501 and 701*a* to 701*n* periodically, and then it transmits the maximum RTT value and the average RTT value of the calculated RTT values to the virtual multicast routers 501 and 701*a* to 701*n*. Accordingly, the multicast source server 301 and the respective virtual multicast routers 501 and 701*a* to 701*n* are always aware of the maximum RTT value and the average RTT value of the virtual multicast routers.

In this circumstance, at step S701, if the multicast agent 423 or the first virtual multicast router 501 requests the multicast source server 301 for the data on the nearest high-ranked virtual multicast router, at step S703, the multicast source server 301 transmits to the other virtual multicast routers 701*a* to 701*n* a command to send the data to the multicast agent 423 or the first virtual multicast router 501 in a particular time period.

At step S705, each of the virtual multicast routers 701*a* to 701*n*, which has received the data transmission command, waits for a time subtracting the average RTT value from the maximum RTT value based on the time point when the data transmission command is received, and transmits the data to the multicast agent 423 or the first multicast router 501.

At step S707, the multicast agent 423 or the first multicast router 501 recognizes the virtual multicast router that has sent the data arriving first among the data transmitted from each of the virtual multicast routers 701*a* to 701*n* as the nearest virtual multicast router and thus obtains the data on the nearest virtual multicast router.

At step S709, the subsequent process is the same as the steps S513 through S521 or the steps S613 through S621 of FIG. 5 or 6.

The method of the present invention described can be embodied as a program and recorded in a computer-readable recording medium, such as CD-ROMs, RAMs, ROMs, floppy disks, hard disks, and optical magnetic disks.

This invention, which is a method and system for virtual multicast networking, can provide multicast application service such as Internet broadcasting effectively even in a network environment that does not support the multicasting function. The dynamic tunneling technology between the virtual multicast routers solves the problem of a conventional static tunneling that a user should set up the tunneling by himself and the problem in multicast networking when a user uses a dynamic IP.

The application of multicast service will be enhanced due to this dynamic tunneling technology, because a multicast network can be established without performing any set up process to the existing network environment.

Later on, when home networking is generalized, it is also possible to use the multicast technology at an end terminal, too, and provide various services by applying the multicast technology to the home gateway.

While the present invention has been described with respect to certain preferred embodiments, it will be apparent to those skilled in the art that various changes and modifications may be made without departing from the scope of the invention as defined in the following claims.

The invention claimed is:

1. A virtual multicast networking system including at least one client and a multicast source network having a multicast source server, for providing a virtual multicast network in a network wherein a non-multicast network that does not support a multicast function is connected through a backbone network to the multicast source network, the virtual multicast networking system comprising:
   a virtual multicast router system included in the non-multicast network, for transmitting or relaying encapsulated multicast data through tunneling with a multicast router or the nearest virtual multicast router system;
   a multicast agent system loaded on at least one client, for receiving the encapsulated multicast data through dynamic tunneling with the nearest virtual multicast router system, extracting the multicast data transmitted by the multicast source server from the encapsulated multicast data, and transmitting the extracted multicast data to an application program loaded on another client; and
   a multicast administration system included in the multicast source network, for storing IP addresses of the virtual multicast router system, and transmitting the IP address information of the virtual multicast router system to the virtual multicast router system or the multicast agent system in response to a request from the virtual multicast router system or multicast agent system;
   wherein the virtual multicast router system includes:
   a tunneling unit for transmitting a dynamic tunneling request including its IP address to the nearest virtual multicast router system, and setting up a tunnel source address and a tunnel destination address for dynamic tunneling based on the dynamic tunneling request from the nearest virtual multicast router system or the multicast agent system;
   a multicast relaying unit for managing the membership information of a multicast group, and transmitting the encapsulated multicast data, which are transmitted from the nearest virtual multicast router system through dynamic tunneling, to at least one client or virtual multicast router system included in the membership information of the multicast group; and
   a multicast routing unit for routing the encapsulated multicast data;
   wherein the multicast agent system includes:
   a dynamic tunneling unit for transmitting a multicast group joining request including the IP address of the multicast agent system to the virtual multicast router system; and
   a multicast data receiving unit for receiving encapsulated multicast data from the virtual multicast router system, removing the header that includes the tunnel source address and the tunnel destination address from the received data, and transmitting the multicast data, which is transmitted from the multicast source server, to an application program of the client; and
   the multicast data receiving unit transmits the multicast data transmitted from the multicast source server to the application program of the client by setting time to live (TTL) at zero using IP multicast; and
   wherein the multicast administration system includes:
   a database for caching and storing in a table the IP address information of all virtual multicast router systems in the network; and
   a virtual multicast router data administration unit which obtains a round trip time (RTT) between the virtual multicast router data administration unit and each of the virtual multicast router systems in the network by transmitting the data for determining the distance to all the virtual multicast router systems, computes an average RTT and the maximum RTT of all the virtual multicast router systems in the network, and transmits the average RTT and the maximum RTT to all the virtual multicast router systems in the network; and
   searches the database upon a request for the address information of the nearest virtual multicast router system from the tunneling unit or the dynamic tunneling unit; and
   when there is information on the nearest virtual multicast router in the database transmits the data on the nearest virtual multicast router to the tunneling unit or the dynamic tunneling unit;
   when there is no information on the nearest virtual multicast router in the database, transmits to all the virtual multicast router systems in the network a command to send, within a predetermined time period, data for determining the distance to the tunneling unit or the dynamic tunneling unit
   wherein the predetermined time period is the average RTT subtracted from the maximum RTT value based upon the time of receipt by each of the virtual multicast router systems in the network of the command from the virtual multicast router data administration unit.

2. The system as recited in claim 1, wherein the virtual multicast router data administration unit searches the database, upon the request for the nearest virtual multicast router system data, and if there is no data in the database on the nearest virtual multicast router, transmitting the address information of all virtual multicast router systems stored in the table to the tunneling unit or the dynamic tunneling unit.

3. The system as recited in claim 2, wherein the tunneling unit or the dynamic tunneling unit obtains the address information of the nearest virtual multicast router system by calculating hop counters based on the address information of all virtual multicast router systems transmitted from the virtual multicast router data administration unit, and transmits the obtained address information of the nearest virtual multicast router system to the virtual multicast router data administration unit.

4. The system as recited in claim 1, wherein the tunneling unit or the dynamic tunneling unit obtains the address information of the nearest virtual multicast router system based on the data that has arrived first among other data sent from all the virtual multicast router systems in the network to check out the distance, and transmits the obtained address information of the nearest virtual multicast router system to the virtual multicast router data administration unit.

5. The system as recited in claim 3, wherein the virtual multicast router data administration unit further performs the function of updating the IP address information of the virtual multicast router systems, which are stored in the database in the form of a table, based on the address information of the nearest virtual multicast router system transmitted from the tunneling unit or the dynamic tunneling unit.

6. The system as recited in claim 5, wherein the virtual multicast router system performs tunneling and transmits the encapsulated multicast data based on a type of the network to which the multicast agent system or the nearest virtual multicast router system that receives the encapsulated multicast data transmitted from the virtual multicast router system belongs.

7. The system as recited in claim 6, wherein the virtual multicast router system emulates the Internet group management protocol (IGMP) snooping function of an L2 switch, in the case where the non-multicast network supports a broadcast or unicast function only.

8. The system as recited in claim 1, wherein the backbone network does not support the multicast function, and the multicast source network includes the virtual multicast router system.

9. The system as recited in claim 1, wherein the backbone network supports the multicasting function,
wherein the multicast source network includes a multicast router,
wherein the tunneling unit has the tunnel source address and the tunnel destination address set up between the virtual multicast router system and the multicast router through static tunneling, and
wherein the multicast relaying unit transmits the encapsulated multicast data, which are transmitted from the multicast router system through static tunneling, to at least one client or virtual multicast router system in the membership information of the multicast group through a multicast router on a sub-network of the non-multicast network, to which the virtual multicast router system belongs.

10. A method for performing virtual multicast networking in a network that includes at least one client, a multicast source network having a multicast source server and a non-multicast network that does not support a multicast function, the method comprising the steps of:
a) at a virtual multicast router system included in the non-multicast network, transmitting or relaying encapsulated multicast data through tunneling with a multicast router or nearest virtual multicast router system;
wherein step a) includes the steps of:
a1) at a tunneling unit included in the virtual multicast router system, transmitting a dynamic tunneling request including the IP address of the virtual multicast router system to the nearest virtual multicast router system;
a2) at the tunneling unit, setting up the tunnel source address and the tunnel destination address for dynamic tunneling based on the dynamic tunneling request transmitted from the nearest virtual multicast router system or multicast agent system;
a3) at a multicast relaying unit included in the virtual multicast router system, managing the membership information of a multicast group, and transmitting the encapsulated multicast data, which are transmitted from the nearest virtual multicast router system through dynamic tunneling, to at least one client or virtual multicast router system in the membership information of the multicast group; and
a4) a multicast routing unit included in the virtual multicast router system, routing the encapsulated multicast data;
b) at a multicast agent system loaded on at least one client, receiving the encapsulated multicast data through dynamic tunneling with the nearest virtual multicast router system, extracting the multicast data transmitted from a multicast source server from the received encapsulated multicast data, and transmitting the extracted multicast data to an application program loaded on another client;
wherein step b) comprises the steps of:
b1) at a dynamic tunneling unit included in the multicast agent system, transmitting a multicast group joining request including the IP address of the multicast agent system to the virtual multicast router system; and
b2) at a multicast data receiving unit included in the multicast agent system, receiving the encapsulated multicast data from the virtual multicast router system, removing the header that includes the tunnel source address and the tunnel destination address from the received encapsulated multicast data, and transmitting the multicast data, which is transmitted from the multicast source server to the application program of the client by setting time to live (TTL) at zero using IP multicast;
c) at a multicast administration system included in a multicast source network, storing IP addresses of the virtual multicast router system, and transmitting the IP address of the virtual multicast router system to the virtual multicast router system or the multicast agent system in response to a request for searching IP addresses of the virtual multicast router from the virtual multicast router system or the multicast agent system;
wherein the step c) includes the steps of:
c1) caching the IP address information of all virtual multicast router systems in the network and storing the cached data in a database in the form of a table;
c2) at the virtual multicast router data administration unit, searching the database and when there is information on the nearest virtual multicast router in the database transmitting the information on the nearest virtual multicast router to the tunneling unit or the dynamic tunneling unit, upon a request for information on the nearest virtual multicast router system from the tunneling unit or the dynamic tunneling unit;
c3) at the virtual multicast router data administration unit, obtaining a round trip time (RTT) between the virtual multicast router data administration unit and each of the virtual router systems by transmitting the data for determining the distance to all the virtual multicast router systems, computing an average RTT and the maximum RTT of all the virtual multicast router systems in the network, and transmitting the average RTT and the maximum RTT to all the virtual multicast router systems in the network;
c4) at the virtual multicast router data administration unit, searching the database upon the request for information on the nearest virtual multicast router system, and when there is no information on the nearest virtual multicast router in the database, transmitting to all the virtual multicast router systems in the network a command to send data, within a predetermined time period, for determining the distance to the tunneling unit or the dynamic tunneling unit; and
wherein the predetermined time period is the average RTT subtracted from the maximum RTT value based upon the time of receipt by each of the virtual multicast router systems of the command from the virtual multicast router data administration unit.

11. The method as recited in claim 10, wherein in step c when there is no information on the nearest virtual multicast router in the database, transmitting the address information of all virtual multicast router systems stored in the table to the tunneling unit or the dynamic tunneling unit.

12. The method as recited in claim 10, wherein the step a2) further includes the steps of:
- a2-1) at the tunneling unit, obtaining the address information of the nearest virtual multicast router system by calculating hop counters based on the address information of all virtual multicast router systems received by the process of the step c3); and
- a2-2) at the tunneling unit, transmitting the obtained address information of the nearest virtual multicast router system to the virtual multicast router data administration unit, and wherein the step b1) further includes the steps of:
- b1-1) at the dynamic tunneling unit, obtaining the address information of the nearest virtual multicast router system by calculating hop counters based on the address information of all virtual multicast router systems received by the process of the step c3); and
- b1-2) at the dynamic tunneling unit, transmitting the obtained address information of the nearest virtual multicast router system to the virtual multicast router data administration unit.

13. The method as recited in claim 10, wherein the step a2) further includes the steps of:
- a2-1) at the tunneling unit, obtaining the address information of the nearest virtual multicast router system based on the data that has arrived first among other data transmitted from all the virtual multicast router systems included in the network to determine the distance; and
- a2-2) at the tunneling unit, transmitting the obtained address information of the nearest virtual multicast router system to the virtual multicast router data administration unit, and wherein the step b1) further includes the steps of:
- b1-1) at the dynamic tunneling unit, obtaining the address information of the nearest virtual multicast router system based on the data that has arrived first among other data transmitted from all the virtual multicast router systems included in the network to determine the distance; and
- b1-2) at the dynamic tunneling unit, transmitting the obtained address information of the nearest virtual multicast router system to the virtual multicast router data administration unit.

14. The method as recited in claim 10, wherein the step c) further comprises the step of:
- c5) at the virtual multicast router data administration unit, updating the IP address information of the virtual multicast router systems, which are stored in the database in the form of a table, based on the address information of the nearest virtual multicast router system transmitted from the tunneling unit or the dynamic tunneling unit.

15. The method as recited in claim 14, wherein in the step a), the tunneling is performed based on a type of the network to which the multicast agent system or the nearest virtual multicast router system that receives the encapsulated multicast data transmitted from the virtual multicast router system belongs, and the encapsulated multicast data are transmitted.

16. The method as recited in claim 15, wherein in the step a), the virtual multicast router system emulates the Internet group management protocol (IGMP) snooping function of an L2 switch, in the case where the non-multicast network supports a broadcast or unicast function.

17. The method as recited in claim 10, wherein a backbone network does not support the multicasting function, and the multicast source network includes the virtual multicast router system.

18. The method as recited in claim 10, wherein a backbone network supports the multicasting function, wherein the multicast source network includes a multicast router, wherein the tunneling unit has tunnel source address and tunnel destination address set up between the virtual multicast router system and the multicast router through static tunneling, and wherein the step a3) includes the step of:
- a3-1) at the multicast relaying unit, transmitting the encapsulated multicast data, which are transmitted from the multicast router system through static tunneling, to at least one client or virtual multicast router system in the membership information of the multicast group through a multicast router included in a sub-network of the non-multicast network, to which the virtual multicast router system belongs.

* * * * *